United States Patent
Wulf (10) Patent No.: US 11,780,501 B2
(45) Date of Patent: Oct. 10, 2023

(54) TRANSVERSE STEERING METHOD AND TRANSVERSE STEERING DEVICE FOR MOVING A VEHICLE INTO A TARGET POSITION, AND VEHICLE FOR THIS PURPOSE

(71) Applicant: ZF CV Systems Hannover GmbH, Hannover (DE)

(72) Inventor: Oliver Wulf, Neustadt (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 252 days.

(21) Appl. No.: 17/195,709

(22) Filed: Mar. 9, 2021

(65) Prior Publication Data

US 2021/0188355 A1    Jun. 24, 2021

Related U.S. Application Data

(63) Continuation of application No. PCT/EP2019/071662, filed on Aug. 13, 2019.

(30) Foreign Application Priority Data

Sep. 10, 2018 (DE) .................. 10 2018 122 055.3

(51) Int. Cl.
*B62D 15/02* (2006.01)
*B62D 6/00* (2006.01)

(52) U.S. Cl.
CPC .......... *B62D 15/025* (2013.01); *B62D 6/002* (2013.01)

(58) Field of Classification Search
CPC ... B62D 15/025; B62D 6/002; B62D 15/0285
USPC ........................................................... 701/41
See application file for complete search history.

(56) References Cited

U.S. PATENT DOCUMENTS

| | | | |
|---|---|---|---|
| 2004/0267423 A1* | 12/2004 | Iwazaki | B62D 15/0285 701/41 |
| 2013/0245929 A1 | 9/2013 | Withopf et al. | |
| 2015/0321666 A1* | 11/2015 | Talty | G05D 1/0259 701/41 |
| 2016/0378118 A1 | 12/2016 | Zeng et al. | |
| 2018/0127024 A1 | 5/2018 | Pourrezaei Khaligh et al. | |
| 2021/0214008 A1* | 7/2021 | Wulf | B60D 1/36 |

FOREIGN PATENT DOCUMENTS

| CN | 103368527 A | 10/2013 |
|---|---|---|
| CN | 104512408 A | 4/2015 |
| CN | 105082910 A | 11/2015 |
| CN | 104512408 B | 11/2017 |

(Continued)

*Primary Examiner* — Scott A Reinbold
(74) *Attorney, Agent, or Firm* — LEYDIG, VOIT & MAYER, LTD.

(57) ABSTRACT

A transverse steering method for moving a vehicle including active steering to a target position includes: performing distance and/or angle measurements between the vehicle and the target position enabling the derivation of location and orientation data; deriving the location and orientation data; filtering the location and orientation data into current values, which include current location values and current orientation values; performing control which derives a target steering angle from the current values; and realization of the target steering angle by acting on the active steering of the vehicle.

5 Claims, 5 Drawing Sheets

(56) References Cited

FOREIGN PATENT DOCUMENTS

| CN | 108016444 | A | | 5/2018 | | |
|---|---|---|---|---|---|---|
| CN | 112839858 | A | | 5/2021 | | |
| DE | 102010004920 | A1 | * | 7/2011 | ............. | B60D 1/167 |
| DE | 102010004920 | A1 | | 7/2011 | | |
| DE | 102016011324 | A1 | | 3/2018 | | |

* cited by examiner

TRANSVERSE STEERING METHOD AND TRANSVERSE STEERING DEVICE FOR MOVING A VEHICLE INTO A TARGET POSITION, AND VEHICLE FOR THIS PURPOSE

CROSS-REFERENCE TO PRIOR APPLICATIONS

This application is a continuation of International Patent Application No. PCT/EP2019/071662, filed on Aug. 13, 2019, which claims priority to German Patent Application No. DE 10 2018 122 055.3, filed on Sep. 10, 2018. The entire disclosure of both applications is incorporated by reference herein.

FIELD

The present disclosure relates to a transverse steering method and a transverse steering device for moving a driven vehicle to a target position with a target location and a target orientation, as well as a vehicle set up for this purpose.

BACKGROUND

From DE 10 2016 011 324 A1, a method for controlling a towing vehicle when it is approaching and coupling to a trailer vehicle is known. The rear surrounding area behind the towing vehicle is captured, for example with a camera; an offset distance and an offset angle between the towing vehicle and the trailer vehicle are evaluated from the data collected; at least one driving trajectory is calculated, by means of which the towing vehicle can be driven autonomously to a coupling location, and the towing vehicle is driven autonomously and coupled in accordance with the driving trajectory.

SUMMARY

A transverse steering method for moving a vehicle including active steering to a target position includes: performing distance and/or angle measurements between the vehicle and the target position enabling the derivation of location and orientation data; deriving the location and orientation data; filtering the location and orientation data into current values, which include current location values and current orientation values; performing control which derives a target steering angle from the current values; and realization of the target steering angle by acting on the active steering of the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

With the method of the prior art it can be considered disadvantageous that a driving trajectory calculated at the beginning of the movement process can be significantly in error, because typically the starting position is only known inaccurately then. In particular, errors of a measured starting orientation lead to a large lateral offset, especially for a large distance to be travelled.

It can also be considered disadvantageous that measured values of the position measurement are typically noisy, in other words contain error components.

An embodiment of the invention provides transverse steering methods and transverse steering devices for moving a vehicle to a target position, with which these disadvantages are avoided. Vehicles which are set up to carry out these transverse steering methods will also be provided.

Transverse steering methods for moving a vehicle into a target position include, according to an embodiment of the invention:
  that distance and/or angle measurements are carried out between the vehicle and the target position, which allow the derivation of location and orientation data,
  that the derived location and orientation data are filtered into current values, which include current location values and current orientation values,
  that control is carried out which derives the target steering angle from the current values,
  and that the target steering angles are realized by acting on an active steering of the vehicle.

In an advantageous development, the transverse steering methods according to an embodiment of the invention include that the control is in the form of a cascade control, with which a target orientation is derived from the current location values in an outer control circuit, and the target steering angle is derived from the target orientation and the current orientation value in an inner control circuit.

In a further advantageous development, the transverse steering methods according to an embodiment of the invention include that filtering the location and orientation data is in the form of Kalman filtering, in which the location and orientation data are processed to the current values taking into account the vehicle's measured driving characteristics, quality values and a motion model of the vehicle.

Transverse steering devices for moving a vehicle with active steering into a target position include according to an embodiment of the invention:
  sensors and markings which are provided and distributed to the vehicle and the target position in such a way that distance and/or angle measurements between the vehicle and the target position can be used to derive location and orientation data,
  a measuring device set up to carry out distance and/or angle measurements between the vehicle and the target position by means of the sensors and markings, and from which the location and orientation data of the vehicle are derived, a measured value filter, which is set up to derive current values which include current location values and current orientation values from the location and orientation data, a controller which is set up in such a way that target steering angles are derived from the current values and are realized by acting on the active steering.

In an advantageous development, the transverse steering devices according to an embodiment of the invention include that the controller is in the form of a cascade controller, with a lateral offset controller which is set up in such a way that it derives a target orientation from the current location values, and an orientation controller which is set up in such a way that it derives the target steering angle from the target orientation and the current orientation value.

In a further advantageous development, the transverse steering devices according to an embodiment of the invention include that the measured value filter is in the form of a Kalman filter, which is set up in such a way that the location and orientation data are processed into the current values taking into account the driving characteristics measured on the vehicle, quality values and a motion model of the vehicle.

A vehicle according to an embodiment of the invention, in particular a driven towing vehicle, is set up to perform a transverse steering method according to an embodiment of the invention and/or has a transverse steering device according to an embodiment of the invention.

Position, as in the case of target position, is understood here as comprising a location and an orientation specification. For example, the location can be specified by coordinates in an absolute or relative two-dimensional or three-dimensional coordinate system. The orientation can be provided by a two-dimensional or three-dimensional angle specification together with an agreement regarding the reference point and the reference angle.

Transverse steering here refers to an effect on the angles of the wheels of the steering axle of the vehicle. In the case of vehicles with multiple steering axles, this may also include an appropriate action on axles other than the main steering axle.

The target position can be a coupling position, i.e. a position in the sense of location and orientation at which the vehicle can be coupled to a trailer or semi-trailer vehicle.

The target position can also be a loading position, i.e. a position at a loading ramp that makes it possible to load or unload the vehicle. The x-axis of the coordinate system, which is fixed with respect to the target position, is preferably placed here in the direction in which the loading position must be approached, for example perpendicular to an edge of a loading ramp.

The target position can also be a charging position, i.e. a position at which the vehicle can be supplied by connection to a supply device equipment such as for fuel, battery charge or hydraulic fluid. The x-axis of the coordinate system, which is fixed with respect to the target position, is preferably placed here in the direction in which the charging position must be approached, for example at a suitable distance longitudinally next to the supply device.

The target position can also be a parking position in a vehicle parking space prepared for partial automation. The x-axis of the coordinate system, which is fixed with respect to the target position, is preferably placed here in the direction in which the parking position must be entered.

The sensor of the vehicle can be, for example, a laser scanner or a LIDAR, a still camera, or a video camera.

Figure 1:
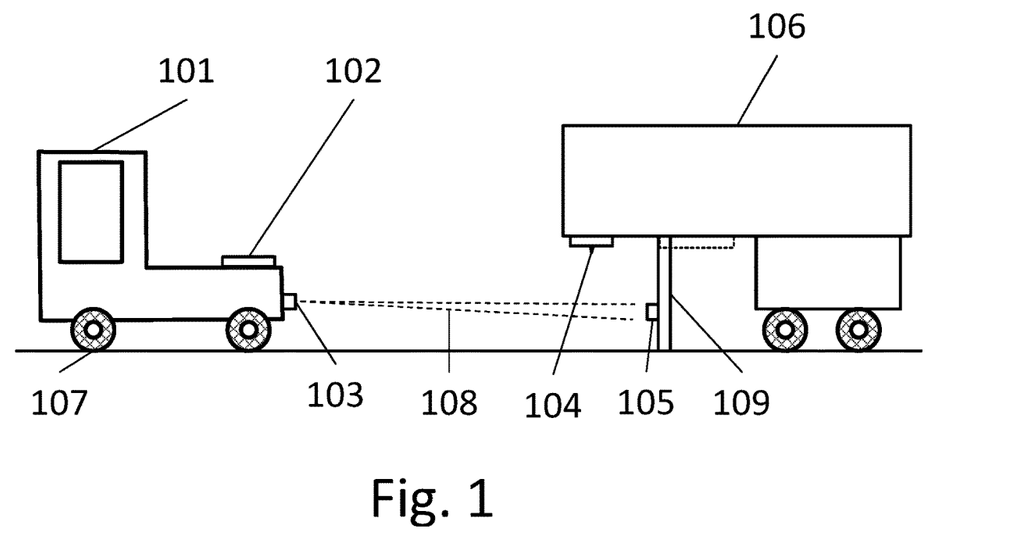
FIG. 1 shows schematically in a side view a use case where the target position is a coupling position.

FIG. 1 shows schematically a use case in a side view, where the target position is a coupling position. The vehicle here is a semi-trailer 101 and comprises active steering 107, two sensors 103 horizontally distanced from the longitudinal axis and a fifth wheel 102. The semi-trailer 101 is at a distance in front of a semi-trailer 106, which comprises a fifth-wheel kingpin 104 and foldable supports 109. Reaching the target position is given here when the fifth wheel 102 has been positioned centrally below the fifth-wheel kingpin 104 in plan view. The supports 109 comprise reflectors 105, which are designed and mounted in such a way that they can be sensed by measurement 108 by the sensors 103 in terms of their direction and/or distance.

Figure 2:
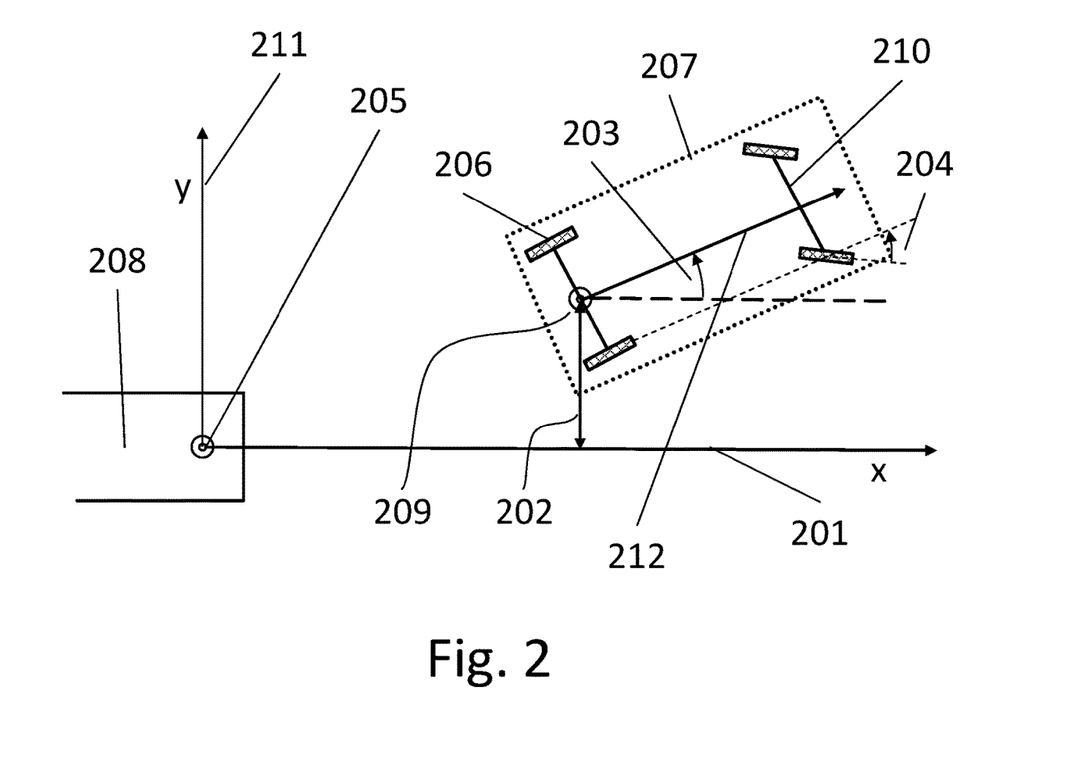
FIG. 2 shows schematically in a plan view the geometric relationships, exemplary definitions and quantities used here using the example of a semi-trailer truck in front of a semi-trailer.

FIG. 2 shows schematically in plan view the geometric relationships, definitions and variables used here using the example of a semi-trailer truck 207 as a vehicle in front of a partially indicated stationary semi-trailer 208 with a fifth-wheel kingpin 205. The origin of a stationary right-angled coordinate system with x-direction 201 and y-direction 211 lies in the fifth-wheel kingpin 205, which is assumed to be the target location. The x-direction corresponds to the longitudinal axis of the semi-trailer 208. The semi-trailer truck 207 comprises an unsteered rear axle 206 and a steered front axle 210 and has a reference point 209, a position, an orientation, a steering angle beta 204 and a longitudinal axis 212. The reference point 209 for the description of the semi-trailer truck 207 is the center of its fifth wheel. The position of the semi-trailer truck 207 is defined by the x-coordinate and the y-coordinate of this reference point 209. Specifically, the y-coordinate of the reference point 209 is also referred to as the lateral offset 202. The orientation of the semi-trailer truck 207 is defined as the angle alpha 203, which the longitudinal axis 212 of the semi-trailer truck 207 includes with the x-direction 201. The steering angle beta 204 of the semi-trailer truck 207 is defined as the angle which the wheels of the front axle 210 include with a parallel to the longitudinal axis 212 of the semi-trailer truck 207.

Figure 3:
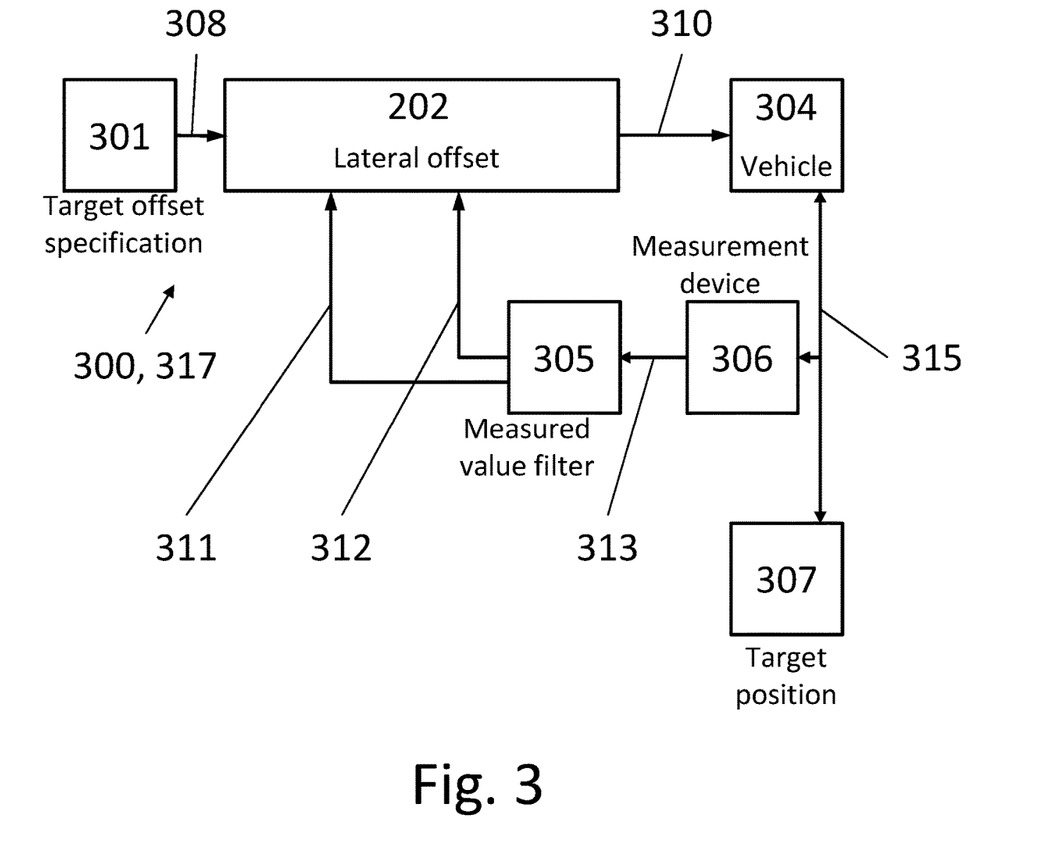
FIG. 3 shows a block diagram for the explanation of a first transverse steering method according to an embodiment of the invention.

FIG. 3 shows a block diagram for explaining of a first transverse steering method 300 and a first transverse steering device 317 according to an embodiment of the invention. The transverse steering method 300 involves a target offset specification 301, a controller 303 acting on a vehicle 304, a measuring device 306, and a measured value filter 305. The controller 303 obtains a target lateral offset or a target offset 308 from the target offset specification 301, as well as values for a current lateral offset 311 and a current orientation 312 of the vehicle 304 from the measured value filter 305. From these input data, the controller 303 derives a target steering angle 310, which is then realized in the vehicle 304 by an action on the active steering 107. The target offset 308, i.e. the lateral offset 202 to be aimed for at the end of the movement, is zero in most practical cases, whereas deviating values may be appropriate in special cases. The measuring device 306 carries out distance and/or angle measurements between the vehicle 304 and a target position 307, which are designed in such a way that location and orientation data 313 of the vehicle 304 can be derived therefrom, and it derives them. The measured value filter 305 processes the location and orientation data 313 and derives therefrom the values for the current lateral offset 311 and the current orientation 312 of the vehicle 304.

For the measurements 315 to be carried out by the measuring device 306 between the vehicle 304 and the target position 307, sensors and detectable markings interact which may be arranged in different ways. For example, as shown in FIG. 1, the sensors 103 can be fixed on the vehicle 101, 304 and the markings 105 can be fixed at a known distance from the target position 104. It is advantageous here that the sensor signals are already available in the vehicle 101, 304 and do not have to be transmitted there first.

The reverse arrangement, i.e. sensors fixed at a known distance from the target position and markings fixed to the vehicle 304, can be used alternatively. The advantage would be that the measurements of the sensors would be created directly in a coordinate system relative to the target position and therefore would not have to be converted.

The number of sensors and markings as well as the type of measurements to be carried out, for example angle or distance measurements, are based on the known principles of triangulation. A possible configuration includes two sensors spaced apart on the vehicle and two markings spaced apart and fixed at a known distance from the target position. For each individual marking, a distance or angle measurement by each of the sensors is sufficient to determine the location of the marking relative to the location of the sensors. The relative orientation between the vehicle and the target position can then be derived from the locations of the two markings.

The location and orientation values determined relative to a first coordinate system can be converted to any other displaced and/or rotated coordinate system using known equations.

In order to reduce measurement inaccuracies or to increase system availability, it may also be appropriate to use further additional sensors and/or additional markings.

Figure 4:
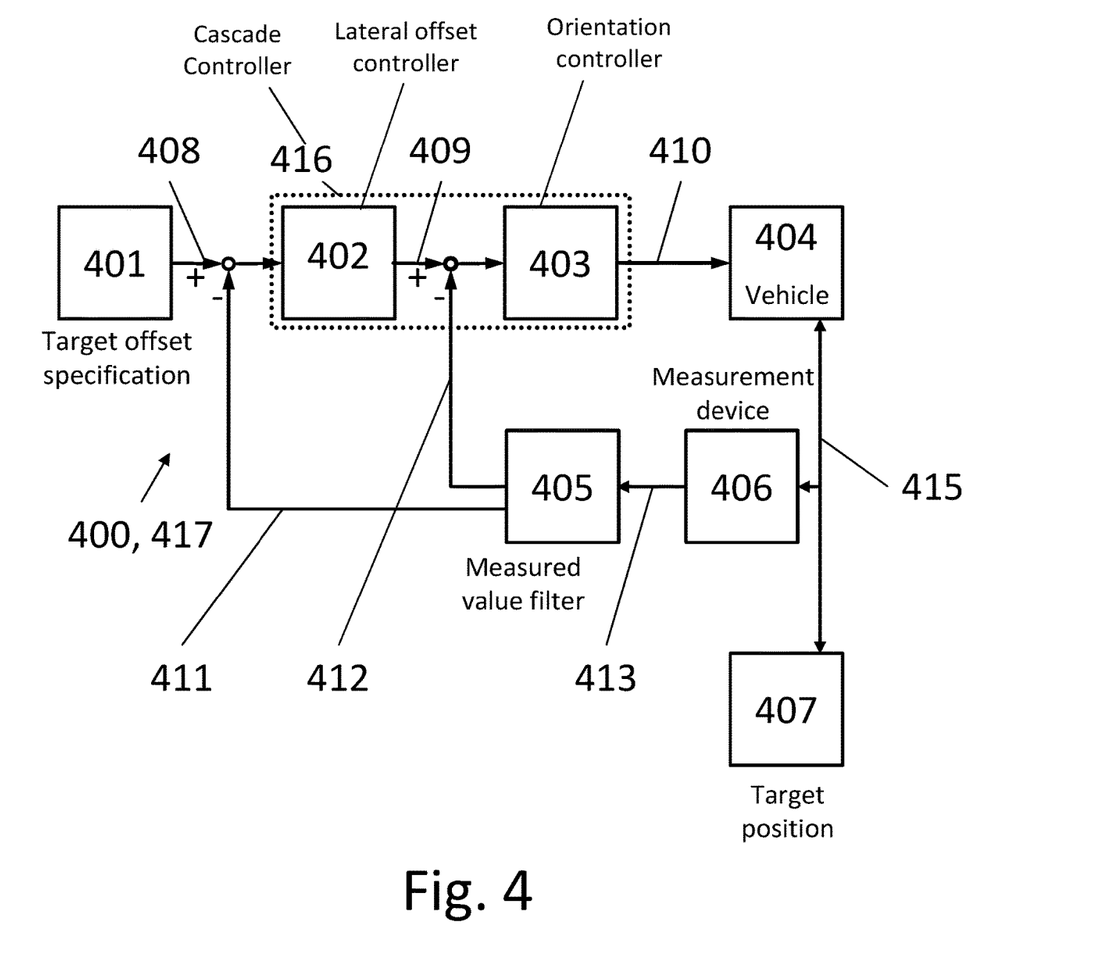
FIG. 4 shows a block diagram for the explanation of a second transverse steering method according to an embodiment of the invention.

FIG. 4 shows a block diagram for the explanation of a second transverse steering method 400 and a second transverse steering device 417 according to an embodiment of the invention. The transverse steering method 400 involves a target offset specification 401, a lateral offset controller 402, an orientation controller 403 acting on a vehicle 404, a measuring device 406, and a measured value filter 405. The lateral offset controller 402 and the orientation controller 403 together form a cascade controller 416.

The lateral offset controller 402 receives as an input variable the target lateral offset or the target offset 408 supplied by the target offset specification 401 minus the current lateral offset 411 supplied by the measured value filter 405, from which the lateral offset controller 402 derives a target orientation 409. The orientation controller 403 receives as an input variable the target orientation 409 minus the current orientation 412 supplied by the measured value filter 405, from which the orientation controller 403 derives a target steering angle 410, which is then realized in the vehicle 404 by action on the active steering 107.

What has been stated above regarding the first transverse steering method 300 also applies accordingly for the target offset 408, the measuring device 406, the location and orientation data 413 and the measured value filter 405, as well as for the sensors and markings.

Figure 5:
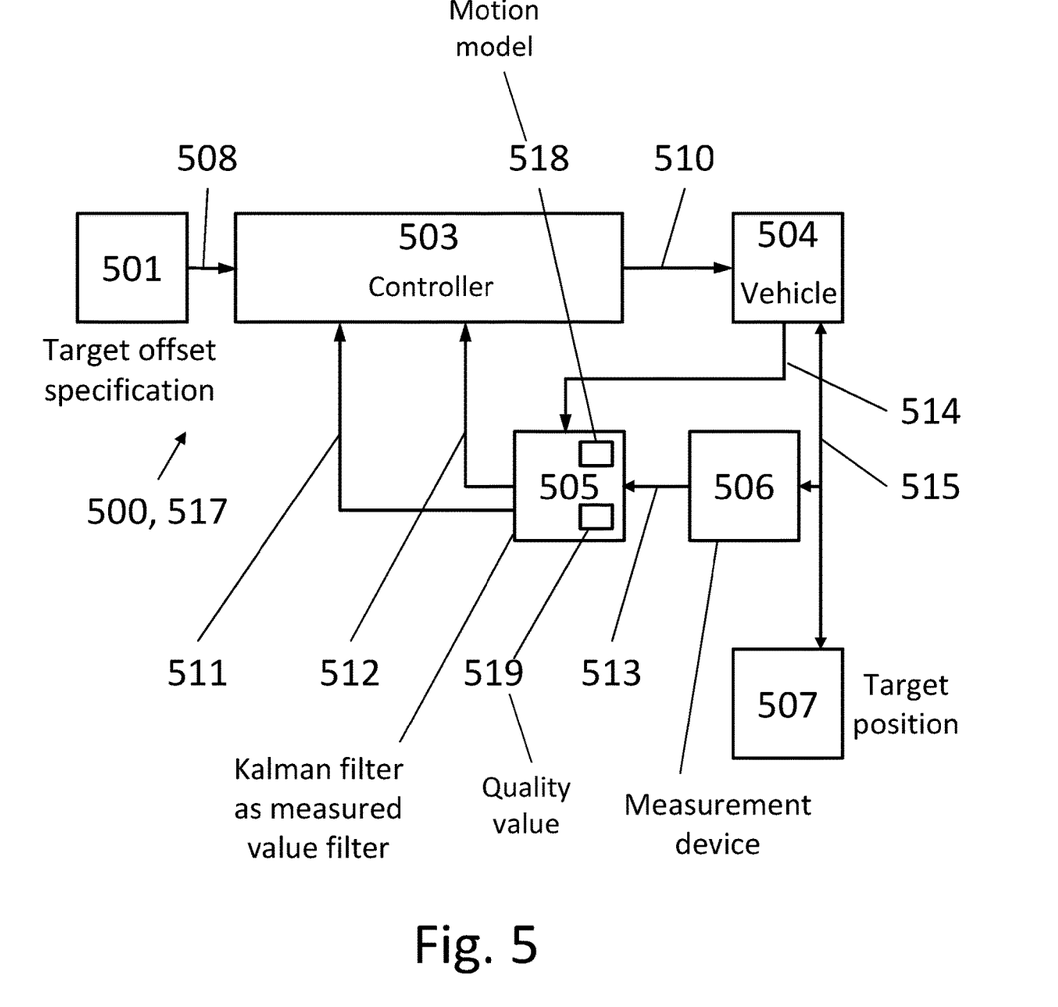
FIG. 5 shows a block diagram for the explanation of a third transverse steering method according to an embodiment of the invention.

FIG. 5 shows a block diagram for the explanation of a third transverse steering method 500 and a third transverse steering device 517 according to an embodiment of the invention. The transverse steering method 500 involves a target offset specification 501, a controller 503 acting on a vehicle 504, a measuring device 506, and a measured value filter 505. What has been stated above regarding the first transverse steering method 300 also applies accordingly for the target offset specification 501, the controller 503, the target steering angle 510 and the measuring device 506. The measured value filter 505 is a Kalman filter, which not only receives the location and orientation data 513 from the measuring device 506, but also a measured speed and a measured steering angle as driving characteristics 514 from the vehicle 504 and derives the current lateral offset 511 and the current orientation 512 therefrom and from a motion model 518 of the vehicle 504.

Figure 6:
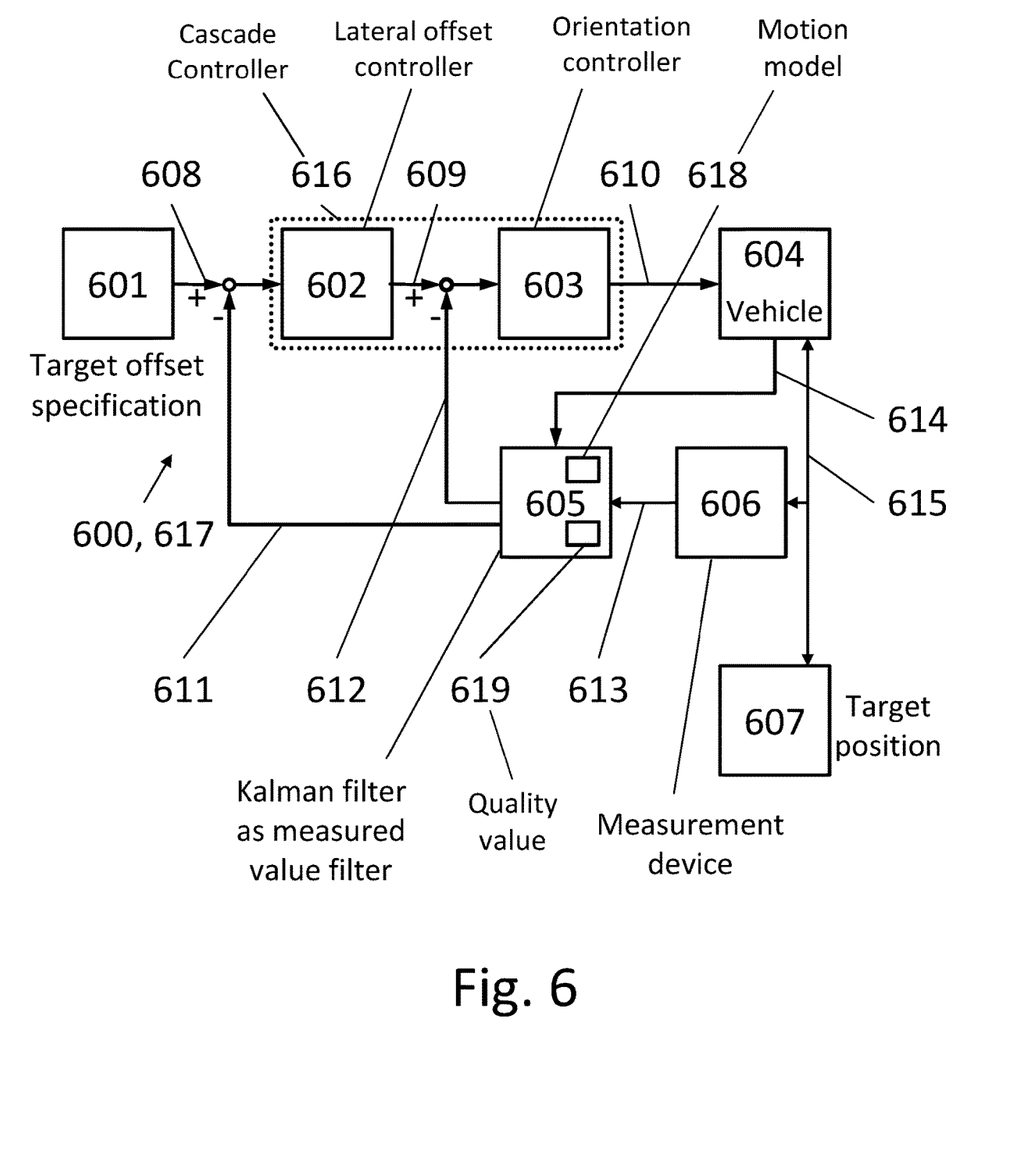
FIG. 6 shows a block diagram for the explanation of a fourth transverse steering method according to an embodiment of the invention.

FIG. 6 shows a block diagram for the explanation of a fourth transverse steering method 600 and a fourth transverse steering device 617 according to an embodiment of the invention. The transverse steering method 600 involves a target offset specification 601, a lateral offset controller 602, an orientation controller 603 acting on a vehicle 604, a measuring device 606, and a measured value filter 605. What has been stated above regarding the second transverse steering method 400 also applies accordingly for the lateral offset controller 602 and the orientation controller 603 and what has been stated above regarding the third transverse steering method 500 applies for the measured value filter 605 in the form of a Kalman filter. The lateral offset controller 602 and the orientation controller 603 together form a cascade controller 616.

An additional influencing factor for all transverse steering methods 300, 400, 500, 600 is the longitudinal control, i.e. the action on the drive train and braking system of the vehicle. This causes the variation of the vehicle speed over time and can be specified completely independently, for example automatically, partially automatically, manually by remote control by a driver outside the vehicle or manually by a driver in the vehicle. The effect of the longitudinal control is reflected on the one hand in the changing location measured values over time, but also on the other hand in the driving characteristics 514, 614 which include a measured speed, and in this way is included in the transverse steering method.

The sensors 103 of the vehicle 101, 207, 304, 404, 504, 604 used for measurement 306, 406, 506, 606 can be a laser scanner, a LIDAR or a still camera, or a video camera, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTERS

101 Semi-trailer truck
102 Fifth wheel
103 Sensors
104 Fifth wheel king pin
105 Reflectors
106 Semi-trailer
107 Active steering
108 Measurement
109 Supports
201 x-direction
202 Lateral offset
203 Orientation angle alpha
204 Steering angle beta
205 Fifth wheel king pin=coordinate origin
206 Rear axle
207 Semi-trailer truck
208 Semi-trailer
209 Reference point
210 Front axle
211 y-direction
212 Longitudinal axis of the semi-trailer
300 Transverse steering method
301 Target offset specification
303 Controller
304 Vehicle
305 Measured value filter
306 Measurement device
307 Target position
308 Target offset
310 Target steering angle
311 Current lateral offset
312 Current orientation
313 Location and orientation data
315 Measurement
317 Transverse steering device
400 Transverse steering method
401 Target offset specification
402 Lateral offset controller
403 Orientation controller
404 Vehicle
405 Measured value filter
406 Measurement device
407 Target position
408 Target offset
409 Target orientation
410 Target steering angle
411 Current lateral offset
412 Current orientation
413 Location and orientation data
415 Measurement
416 Cascade controller
417 Transverse steering device
500 Transverse steering method
501 Target offset specification
503 Controller
504 Vehicle
505 Kalman filter as measured value filter
506 Measurement device
507 Target position
508 Target offset
510 Target steering angle
511 Current lateral offset
512 Current orientation
513 Location and orientation data
514 Driving characteristics
515 Measurement
517 Transverse steering device
518 Motion model
519 Quality value
600 Transverse steering method
601 Target offset specification
602 Lateral offset controller
603 Orientation controller
604 Vehicle
605 Kalman filter as measured value filter
606 Measurement device
607 Target position
608 Target offset
609 Target orientation
610 Target steering angle
611 Current lateral offset
612 Current orientation
613 Location and orientation data
614 Driving characteristics
615 Measurement
616 Cascade controller
617 Transverse steering device
618 Motion model
619 Quality value

What is claimed is:

1. A transverse steering method for moving a vehicle comprising active steering to a target position, including:
    performing distance and/or angle measurements between the vehicle and the target position enabling the derivation of location and orientation data,
    deriving the location and orientation data,
    filtering the location and orientation data into current values, which include current location values and current orientation values,
    performing control which derives a target steering angle from the current values, and
    realization of the target steering angle by acting on the active steering of the vehicle,
    wherein:
        the control includes a cascade control, with which a target orientation is derived from the current location values in an outer control circuit, and the target steering angle is derived from the target orientation and the current orientation value in an inner control circuit, and
        the target orientation is derived proportionally to the difference from a target offset minus a current lateral offset derived from the current location values, and the target steering angle is derived proportionally to the difference from the target orientation minus the current orientation value.

2. The transverse steering method as claimed in claim 1, wherein the filtering of the location and orientation data includes Kalman filtering with which the location and orientation data are processed into the current values taking into account driving characteristics measured on the vehicle, quality values and a motion model of the vehicle.

3. A transverse steering device for moving a vehicle comprising active steering into a target position, comprising:
    sensors and markings which are provided and distributed to the vehicle and the target position such that location and orientation data can be derived from distance and/or angle measurements between the vehicle and the target position,
    a measuring device which is set up to carry out the distance and/or angle measurements between the vehicle and the target position using the sensors and the markings and derives location and orientation data of the vehicle from this, a measured value filter which is set up to derive current values, which include current location values and current orientation values, from the location and orientation data, and a controller, which is set up such that target steering angles are derived from the current values and are realized by acting on the active steering, wherein:

the controller in the form of a cascade controller with a lateral offset controller is set up to derive a target orientation from the current location values and an orientation controller is set up to derive the target steering angle from the target orientation and the current orientation value, and the lateral offset controller is set up to derive the target orientation proportionally to the difference from a target offset minus a current lateral offset derived from the current location values, and the orientation controller is set up to derive the target steering angle proportionally to the difference from the target orientation minus the current orientation value.

4. The transverse steering device as claimed in claim 3, wherein the measured value filter is in the form of a Kalman filter, which is set up in such a way that the location and orientation data are processed into the current values taking into account driving characteristics measured on the vehicle, quality values and a motion model of the vehicle.

5. A vehicle, in particular a driven towing vehicle, with active steering, wherein it is set up to perform a transverse steering method as claimed in claim 1.

* * * * *